United States Patent [19]

Yamamoto et al.

[11] Patent Number: 4,684,705

[45] Date of Patent: Aug. 4, 1987

[54] CONTACT LENS

[75] Inventors: Fumio Yamamoto, Nishinomiya; Takayoshi Suzuki, Kurashiki; Masahiro Ikari, Kurashiki; Susumu Saito, Kurashiki; Akira Ohmori, Ibaraki; Takashi Yasuhara, Settsu, all of Japan

[73] Assignee: Kuraray Co., Ltd, Kurashiki, Japan

[21] Appl. No.: 887,206

[22] Filed: Jul. 21, 1986

[30] Foreign Application Priority Data

Aug. 2, 1985 [JP] Japan ................. 60-171586

[51] Int. Cl.$^4$ ............................................ C08F 18/20
[52] U.S. Cl. .................................................. 526/246
[58] Field of Search ........................................ 526/246

[56] References Cited

U.S. PATENT DOCUMENTS

| | | | |
|---|---|---|---|
| 3,424,785 | 1/1969 | Pittman et al. | 526/246 |
| 3,901,864 | 8/1975 | Jager | 526/246 |
| 3,950,315 | 4/1976 | Cleaver | 526/245 |
| 4,130,706 | 12/1978 | Plaurbeck, Jr. | 526/245 |
| 4,433,125 | 2/1984 | Ichinohe et al. | 526/279 |

FOREIGN PATENT DOCUMENTS

| | | | |
|---|---|---|---|
| 57-51705 | 3/1982 | Japan | 526/245 |
| 59-197412 | 11/1984 | Japan | 526/246 |

*Primary Examiner*—Joseph L. Schofer
*Assistant Examiner*—N. Sarofim
*Attorney, Agent, or Firm*—Burns, Doane, Swecker & Mathis

[57] ABSTRACT

The contact lenses of the present invention are formed of copolymers with monomers having hydroxyl groups and fluoroalkyl groups as their components. This invention makes it possible to provide contact lenses which are excellent not only in oxygen permeability, wettability and hardness, but also in contamination resistance to protein, lipids, etc., and transparency, etc.

7 Claims, No Drawings

CONTACT LENS

FIELD OF THE INVENTION

The present invention relates to contact lenses. More particularly, it pertains to contact lenses formed of fluorine contacting copolymers with fluorinated acrylic or methacrylic esters having hydroxyl groups as their components, which lenses are excellent not only in high oxygen permeability and wettability, but also in contamination resistance and hardness, etc.

DESCRIPTION OF THE PRIOR ART

Heretofore, contact lenses made of 2-hydroxyethyl methacrylate or vinyl pyrrolidone as their main component, which contains water, and those made of methyl methacrylate (MMA) or siloxanyl alkyl methacrylate as their main component, which does not contain water, have been available on the market.

The aforementioned water containing ones are all liable to contamination by bacteria, proteins, lipids, etc., and for the remedy, frequent treatment by boiling or by use of chemical solutions, which is bothersome to the users, is indispensable. And such treatments involve risks of causing deterioration of the materials of contact lenses or injury of eyes by residual chemical solution.

Conventional products with MMA as their main component which contain no water have grave disadvantages in that their oxygen permeability is quite low and that their continuous use is objectionable on account of corneal physiology. Conventional products with siloxanylalkyl methacrylate as their main component have superior oxygen permeability as compared to those with MMA as their main component, but are inferior in hardness and wettability and, moreover, have the disadvantage in being liable to contamination by lipids, etc.

Of late, an attempt has been made, with a view to solve the problems as hereabove-mentioned, to use as materials of contact lenses copolymers of acrylic or methacrylic esters which contain fluorine atoms as their main component. There have been disclosed, for example, contact lenses formed of copolymers of specified perfluoroalkyl alkylmethacrylate and or telomer alcohol methacrylate with MMA in Japanese Patent Publication No. 46614/1976, contact lenses formed of copolymers of specified perfluoroalkyl alkylmethacrylate with a monomer such as hydroxyethyl methacrylate, etc., which contains polar groups having wettability in Japanese Patent Application Laid-Open No. 29660/1979, contact lenses formed of copolymers of polyfluoroalkyl methacrylate of a specified structure with methacrylic esters in Japanese Patent Application Laid-Open No. 118408/1981, contact lenses formed of copolymers of fluorinated (meth)acrylic esters with (meth)acrylic esters in Japanese Patent Application Laid-Open No. 51705/1982 and contact lenses formed of copolymers with organosilanes or organosiloxanes which contain specified groups and compounds containing fluoroalkyl groups as their main components in Japanese Patent Application Laid-Open No. 28127/1984; for these contact lenses made of copolymers comprising methacrylic esters which have fluorine atoms, future deployment is expected.

In the aforementioned copolymers with acrylic or methacrylic esters containing fluorine atoms as their main components, increasing the amount of fluorine atoms improves oxygen permeability repellency, but their water repellency which has deleterious effect on contact lenses, increases and hardness declines. At high water repellency, the lens repels tears, resulting in failure to play its role, by feeling uncomfortable when worn. Besides, as the hardness decreases machinability degrades, which invites a fall in the yield of lens products during manufacturing, and making the lenses susceptible to injury. In order to impart wettability to contact lenses, it was attempted to make copolymerization of monomers containing hydrophilic hydroxyl groups, etc., with said acrylic or methacrylic esters. Because of the compatibility of said acrylic or methacrylic esters with monomers having hydrophilic groups being low, the copolymers thus obtained were inferior in transparency to the original ones with acrylic or methacrylic esters as their main components.

As hereabove described, no contact lenses are known to have been available for now which are not only excellent in oxygen permeability and wettability, but also have all other characteristics required of acceptable contact lenses including contamination resistance, high hardness and transparency.

SUMMARY OF THE INVENTION

An object of this invention is to provide contact lenses which have not only high oxygen permeability, but excellent wettability as well, thus giving a comfortable feel when worn.

Another object of this invention is to provide contact lenses which are highly machinable, moreover, have high hardness.

Still another object of this invention is to provide contact lenses which show large contamination resistance such that they do not frequently require chemical solution treatment.

Such objects of this invention will now be achieved by forming into contact lenses copolymers which are substantially composed of 40–95 parts by weight of a structural unit represented by formula (a):

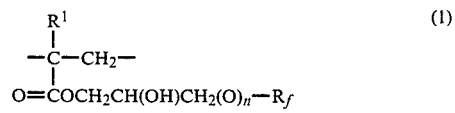

(where $R^1$ stands for a hydrogen atom or methyl group; Rf, polyfluoroalkyl group having 1–15 carbon atoms; and n, either 0 or 1) and 60–5 parts by weight of at least one member selected from among a group of structural units consisting of a structural unit represented by formula (b):

(where $R^1$ stands for the same as the aforementioned and $R^2$ identifies with alkyl groups having 1–20 carbon atoms or polyfluoroalkyl groups having 1–15 carbon atoms), another structural unit represented by formula:

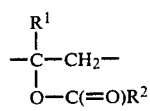 (3)

(where $R^1$ and $R^2$ refer to the same as the aforementioned), and still another structural unit represented by formula:

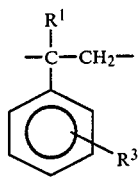 (4)

(where $R^1$ stands for the same as the aforementioned and $R^3$ designates hydrogen atom, alkyl group having 1-5 carbon atoms or halogene atom).

DETAILED DESCRIPTION OF THE INVENTION

As a result of pursuing further studies on fluorine-containing copolymers having as their component acrylic or methacrylic esters containing fluorine atoms, which had hitherto found only scarce practical uses, because of their water repellency and insufficient hardness, the present inventors found out that fluorine containing copolymers having as their components fluorine containing acrylic or methacrylic esters which have hydroxyl groups have all the aforementioned characteristics required of contact lenses; this finding has lead to this invention.

Thus the present invention provides contact lenses formed of copolymers which are substantially composed of 40-95 parts by weight of a structural unit represented by formula (a):

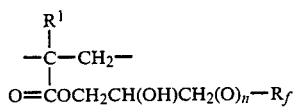 (1)

(where $R^1$ stands for hydrogen atom or methyl group; $R_f$, polyfluoroalkyl group having 1-15 carbon atoms; and n, either 0 or 1) and 60-5 parts by weight of at least one member selected from among a group of structural units consisting of a structural unit represented by formula (b):

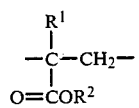 (2)

(where $R^1$ stands for the same as the aforementioned and $R^2$ identifies with alkyl groups having 1-20 carbon atoms or polyfluoroalkyl groups having 1-15 carbon atoms), another structural unit represented by formula:

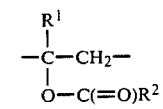 (3)

(where $R^1$ and $R^2$ refer to the same as the aforementioned), and still another structural unit represented by formula:

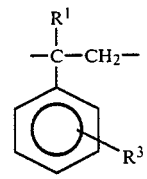 (4)

(where $R^1$ stands for the same as the aforementioned and $R^3$ designates hydrogen atom, alkyl group having 1-5 carbon atoms or halogen atom).

According to this invention, the polyfluoroalkyl group means an alkyl group part or all of hydrogen atoms of which are substituted by fluorine atoms; normally, 2-31 fluorine atoms are contained in such a group. Said polyfluoroalkyl group should preferably contain 5-10 carbon atoms and 10-20 fluorine atoms.

The copolymers of this invention may be obtained by copolymerizing 40-95 parts by weight of a monomer represented by formula:

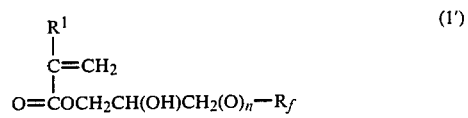 (1')

(where $R^1$, $R_f$ and n denote the same as hereabovementioned) with 60-5 parts by weight of at least one member of a group of monomers consisting of a monomer represented by formula:

 (2')

(where $R^1$ and $R^2$ denote the same as the aforementioned), another monomer represented by formula:

 (3')

(where $R^1$ and $R^2$ denote the same as the aforementioned) and still another monomer represented by formula:

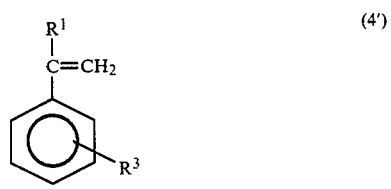 (4')

(where $R^1$ and $R^3$ denote the same as the aforementioned).

Concrete forms of the monomers of (1') are illustrated hereunder:

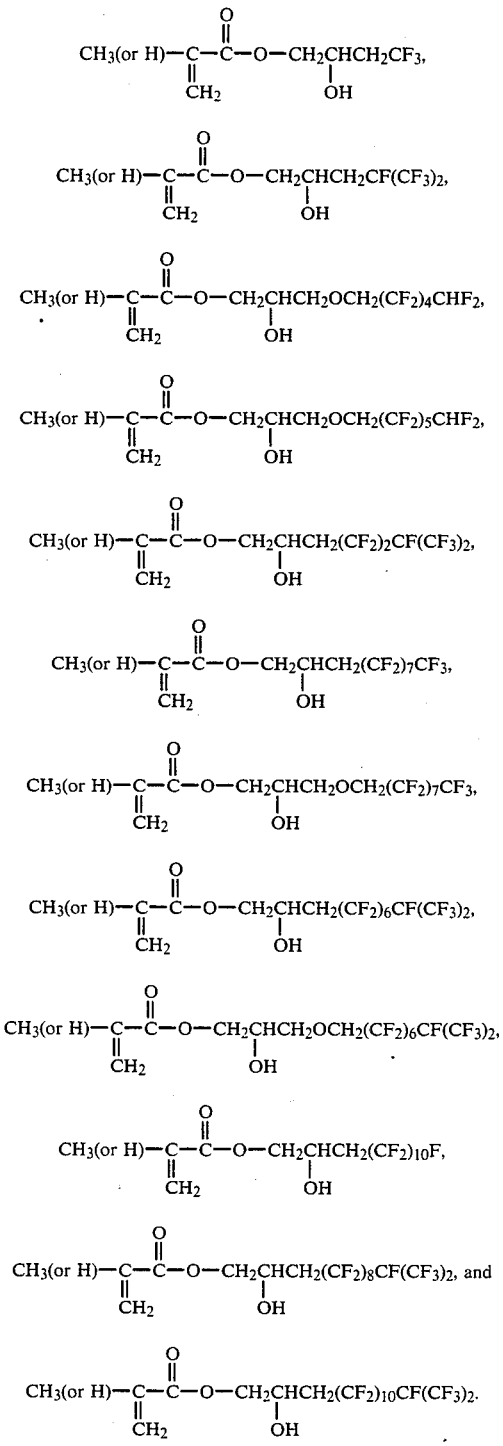

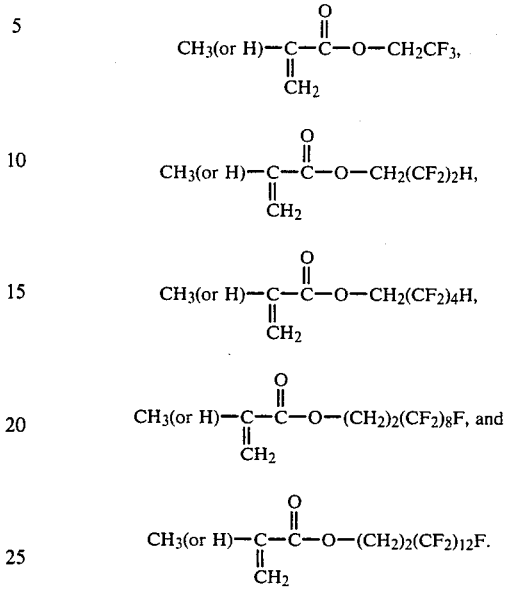

These monomers may be readily synthesized by the normal method from corresponding epoxides and acrylic or methacrylic acid.

As concrete examples of the monomers of (2'), following compounds may be mentioned: Methyl (meth)acrylate, isopropyl (meth)acrylate, n-butyl (meth)acrylate isobutyl (meth)acrylate, tert-butyl (meth)acrylate, cyclohexyl (meth)acrylate, 2-ethyl hexyl (meth)acrylate, tridecyl (meth)acrylate, stearyl (meth)acrylate, Concrete examples of the monomers of (3') include: Vinyl acetate, vinyl butylate, vinyl caproate, vinyl caprylate, vinyl caprate, vinyl laurate, vinyl myristate, vinyl palmitate, vinyl stearate, etc.

Mentioned as concrete examples of the monomers (4') are: Styrene, paramethyl styrene, para-tertbutyl styrene, para-chlorostyrene, etc.

According to this invention, two or more members of each group of monomers covered by the aforementioned formulae may be used together.

According to this invention, when the proportion of the monomers represented by the formula (1') are particularly 60–90% by weight, copolymers which give adequate oxygen permeability and hardness may be obtained. If the number of carbon atoms and that of fluorine atoms in the polyfluoroalkyl group contained in the monomers represented by the formula (1'), when used within the range above-mentioned, are 5–10 and 10–20, respectively, methyl, isopropyl, n-butyl, isobutyl, t-butyl and cyclohexyl esters of methacrylic acid are preferable as the monomers to be copolymerized with these monomers, in consideration of the merits achievable in the workability and configurational stability, etc., of the copolymers thereby obtained.

In order to have excellent workability and thermal configurational stability in the materials of this invention, besides the aforementioned monomers, monomers having two or more groups which permit further cross-linking of the copolymers produced, for example, ethylenically unsaturated groups, may be used as comonomers. Any of these comonomers normally may be used up to 20 parts by weight on the basis of the sum total amount as 100 parts by weight of the monomers represented by (1') and at least one member selected from among a group of monomers consisting of those represented by (2')–(4'). As concrete examples of these comonomers, there may be mentioned: Ethylene glycol dimethacrylate, diethylene glycol dimethacrylate, trimethylolpropane trimethacrylate, allyl methacrylate, divinyl benzene, pentaerythritol tetramethacrylate, etc.

In practical uses, trimethylol propane trimethacrylate or ethylene glycol dimethacrylate is preferable.

Although materials of this invention give high wettability, despite the large contents of fluorine atoms, this property may be further improved by adding up to 15 parts by weight of some of hydrophilic monomers on the basis of the total monomers as 100 parts by weight. Too large an amount of such monomers will raise the water content of these materials, thus making them undesirably susceptible to bacterial infection. Concrete examples of hydrophilic monomers include: Ethyleneglycol mono(meth)acrylate, diethyleneglycol mono(methy)acrylate, n-vinyl pyrrolidone, dimethyl acryl amide, methacrylic acid and acrylic acid, etc.

Further, according to this invention, there is no need of forming copolymers by positively adding hydrophobic monomers other than those of (2')–(4'), but their use in ranges where they do not interfere with realization of the lenses' characteristics of this invention is in no way objectionable. Use of siloxanyl alkyl (meth)acrylates with the number of Si atoms less than 16 is undesirable, because of disadvantages in that they cause whitish turbidity of copolymers, their reduced hardness, susceptibility to contamination and lowered wettability.

The copolymers of this invention may be prepared by any conventional methods for polymerizing acrylate or methacrylate, for example, bulk polmerization, solution polymerization, etc., but the bulk polymerization is preferable in providing transparent products. Initiators of polymerization should be peroxides or azo compounds which produce free radicals. They include: e.g., benzoyl peroxide, lauroyl peroxide, di-isopropyl peroxydicarbonate, di-sec-butyl peroxydicarbonate, azobisisobutyronitrile, azobisdimethyl valeronitrile, azobisdimethylisobutylate, etc. Initiators of polymerization should preferably decompose at low temperatures, to yield free radicals, in view of the operation of polymerization. The amount of the initiator of polymerization to be used should be normally 0.01–1% by weight, preferably, 0.05–0.5% by weight, of the total monomers. When preparing the copolymers of this invention by way of bulk polymerization, a mixture of the monomers and initiator of polymerization is poured into a mold in the shape of a plate, bar or column, etc., which is normally made of metal, glass, plastic, etc., and the reaction is performed by stepwise heating, for example, at 30°–120° C. in approx. 24–50 hr. The heating method is not specifically restricted. Use of a container in the shape of the contact lens in making the bulk polymerization will lends itself to the processing operation.

The copolymers as obtained by the aforementioned operation may be finished as contact lenses by cutting and polishing similarly as in the well-known method used in processing polymethyl methacrylate.

EXAMPLE

In the following, some preferred embodiments of this invention are described, but they will not bind the scope of this invention. Everywhere in the description of these embodiments, "parts" signifies parts by weight and measurements of respective physical properties were made, using the following measuring instruments:

Oxygen permeability coefficient: Oxygen gas permeater manufactured by Rikaseiki Kogyo Co., Ltd.

Vickers hardness: Microhardness tester (type MVK-F) manufactured by Akashi Seisakusho Co., Ltd.

Contact angle: Goniometer type contact-angle-meter (type G-I) manufactured by Erma Optical Works, Ltd.

EXAMPLE 1 (when monomers having two or more ethylenically unsaturated groups are contained in the copolymers)

Seventy parts of a monomer (19FM-OH) represented by the formula

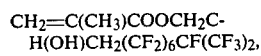

$CH_2=C(CH_3)COOCH_2CH(OH)CH_2(CF_2)_6CF(CF_3)_2$, 23 parts of methyl methacrylate, 7 parts by trimethylolpropane trimethacrylate and 0.1 part of 2,2'-azobis-(2,4-dimethyl valeronitrile) were uniformly mixed. The mixture was, then, put in a test tube made of polypropylene and deaerated under reduced pressure. Said test tube was hermetically sealed, put in a constant temperature water bath, in which it was heated for 20 hr at 40° C., for 10 hr at 50° C. and for 5 hr at 70° C., and, then, heated further for 2 hr in a hot air drier at 90° C., thereby causing copolymerization of the aforementioned monomers. Thereafter, the solid product of copolymer thus obtained was taken out of the test tube, heated at 120° C. for 1 hr and, then, left to cool naturally. In this way, a colorless and transparent bar shape copolymer product was obtained.

Examples 2–7 and Comparison Examples 1–2

Copolymers were prepared by the similar procedure as that of Example 1, except that the monomers used and their proportions were altered to those shown in Table 1.

Examples 8–10

Copolymers were prepared by the similar procedure as that used in Example 1, except that the monomers used and their proportions were altered to those shown in Table 2.

Examples 11–21 (when various monomers (2')–(4') above-mentioned were used.)

Copolymers were prepared by a procedure similar to that used in Example 1, except that the monomers and their proportions shown in Table 3 were adopted in place of those of Example 1.

Comparison Examples 3–5

Copolymers were prepared by a procedure similar to that used in Example 1, except that the monomers and their proportions shown in Table 4 were adopted in place of those in Example 1.

Examples 1–21 and Comparison Examples 1–5 (Oxygen permeability and Vickers hardness number)

From each of the bar shape products obtained in the aforementioned Examples 1–21 and Comparison Examples 1–5, test pieces 13 mm in diameter and 0.2 mm thick was taken by cutting and grinding.

The oxygen permeability at 35° C. of each of the aforementioned test pieces was measured. The results of these tests are shown in Table 1 (Examples 1–7 and Comparison Examples 1–2), Table 2 (Examples 8–10), Table 3 (Examples 11–21) and Table 4 (Comparison Examples 3–5).

Besides, from each of the aforementioned bar shape products, a disc 13 mm in diameter and 3 mm thick was taken by cutting and its Vickers hardness number was measured at 20° C. The test results are set forth in Table 1 (Examples 1–7 and Comparison Examples 1–2), Table 2 (Examples 8–10), Table 3 (Examples 11–21) and Table 4 (Comparison Examples 3–5).

Example 22 and Comparison Examples 6–9
(Contamination resistance)

Test pieces 13 mm in diameter and 1 mm thick, respectively, taken from polymethyl methacrylate (trade name: PARAGLAS) manufactured by Kyowa Gas Chemical Industries, Ltd., siloxanyalkyl methacrylate copolymers which were produced by copolymerizing 50 parts by weight of SiMA {tris(trimethyl siloxy)silylpropyl methacrylate} and 50 parts by weight of MMA, following the procedure of Example 1, 2-hydroxyethyl methacrylate copolymer manufactured by Hydron Europe, Inc., and the copolymer of Comparison Example 4 were dipped in a physiological saline solution containing 0.1% by weight of Lysozyme (chicken egg white, manufactured by Wako Pure Chemical Industries, Ltd.) at the room temperature for 30 days and, then, taken out and dried in air. Their contamination resistance was examined (respective Comparison Examples 6, 7, 8 and 9) by measuring the permeability of visible light (wavelength 400 nm) through said test pieces before and after their dipping (by a double-beam spectrophotometer, type 228A, manufactured by Hitachi, Ltd.) The results are exhibited in Table 5. The lower diminishing rate of permeability suggests lower susceptibility to contamination.

Examples 23–26 and Comparison Examples 10–12
(Wettability)

Test pieces 13 mm in diameter and 3 mm thick listed in Table 6 were dipped in 0.9% by weight of physiological saline solution at 20° C. for 24 hr and, thereafter, their contact angles with air bubble in the physiological saline solution were measured. The results are shown in Table 6. Smaller contact angles suggest better wettability.

Contact lenses were manufactured from the copolymers prepared in the respective Examples above-described. All of them gave excellent cutting and polishing properties.

These lenses were put to a wearing test for 3 months, 10–14 hours every day. Their wearing feel was good without abnormalities in the cornea or contamination of the lenses.

TABLE 1

| Example | Monomer (parts) | | | | Oxygen permeability ($\times 10^{-11}$ cc · cm/cm$^2$ · sec · mmHg) | Vickers hardness number |
|---|---|---|---|---|---|---|
| | 19FM—OH | MMA | TPTMA | EGDMA | | |
| 1 | 70 | 23 | 7 | — | 11.2 | 13.3 |
| 2 | 88 | 5 | 7 | — | 23.2 | 9.1 |
| 3 | 80 | 13 | 7 | — | 14.9 | 11.3 |
| 4 | 70 | 20 | — | 10 | 13.4 | 14.0 |
| 5 | 60 | 33 | 7 | — | 8.5 | 15.4 |
| 6 | 50 | 40 | — | 10 | 5.1 | 17.9 |
| 7 | 38 | 57 | — | 5 | 2.4 | 17.1 |
| Comparison Example | | | | | | |
| 1 | 92 | 3 | 5 | — | 26.5 | 7.6 |
| 2 | 30 | 65 | — | 5 | 1.2 | 18.3 |

In this table, MMA, TPTMA and EGDMA respectively represent methyl methacrylate, trimethylolpropane trimethacrylate and ethyleneglycol dimethacrylate.

TABLE 2

| Example | Monomer (parts) | MMA | TPTMA | Oxygen permeability ($\times 10^{-11}$ cc · cm/cm$^2$ · sec · mmHg) | Vickers hardness number |
|---|---|---|---|---|---|
| 8 | 19FA—OH 70 | 23 | 7 | 10.8 | 10.3 |
| 9 | 17FM—OH 70 | 23 | 7 | 9.2 | 11.4 |
| 10 | 12FMO—OH 70 | 23 | 7 | 8.0 | 12.7 |

In this table 19FA—OH, 17FM—OH and 12FMO—OH respectively stand for
$CH_2=CHCOOCH_2CH(OH)CH_2(CF_2)_6CF(CF_3)_2$,
$CH_2=C(CH_3)COOCH_2CH(OH)CH_2(CF_2)_7CF_3$ and
$CH_2=C(CH_3)COOCH_2CH(OH)CH_2OCH_2(CF_2)_5CHF_2$.

TABLE 3

| Example | Monomer (parts) | | | | | | | | | | | Oxygen permeability ($\times 10^{-11}$ cc · cm/cm$^2$ · sec · mmHg) | Vickers hardness number |
|---|---|---|---|---|---|---|---|---|---|---|---|---|---|
| | 19FM—OH | iso-PrMA | n-BuMA | iso-BuMA | t-BuMA | cy-HexMA | St | VAc | 3FM | TPTMA | EGDMA | | |
| 11 | 70 | 23 | — | — | — | — | — | — | — | 7 | — | 18.1 | 11.3 |
| 12 | 70 | — | 20 | — | — | — | — | — | — | 10 | — | 17.5 | 9.1 |
| 13 | 70 | — | — | 23 | — | — | — | — | — | 7 | — | 18.0 | 10.2 |
| 14 | 70 | — | — | — | 23 | — | — | — | — | 7 | — | 17.8 | 10.7 |
| 15 | 70 | — | — | — | — | 23 | — | — | — | 7 | — | 13.4 | 11.4 |
| 16 | 70 | — | — | — | — | — | 23 | — | — | 7 | — | 9.6 | 17.2 |
| 17 | 60 | — | — | — | 10 | — | — | 20 | — | 10 | — | 17.0 | 9.0 |
| 18 | 70 | — | — | — | — | — | — | — | 23 | 7 | — | 16.7 | 13.6 |
| 19 | 50 | 45 | — | — | — | — | — | — | — | — | 5 | 12.1 | 12.7 |
| 20 | 50 | — | — | 40 | — | — | — | — | — | — | 10 | 12.5 | 9.7 |

TABLE 3-continued

| Example | Monomer (parts) | | | | | | | | | | Oxygen permeability ($\times 10^{-11}$ cc·cm/ cm²·sec·mmHg) | Vickers hardness number |
|---|---|---|---|---|---|---|---|---|---|---|---|---|
| | 19FM—OH | iso-PrMA | n-BuMA | iso-BuMA | t-BuMA | cy-HexMA | St | VAc | 3FM | TPTMA | EGDMA | | |
| 21 | 50 | — | — | — | 45 | — | — | — | — | — | 5 | 12.2 | 13.3 | iso-PrMA: Isopropyl methacrylate
n-BuMA: n-Butyl methacrylate
iso-BuMA: Isobutyl methacrylate
t-BuMA: t-Butyl methacrylate
cy-HexMA: Cyclohexyl methacrylate
St: Styrene
VAc: Vinyl acetate
3FM: 2,2,2-trifluoroethyl methacrylate

TABLE 4

| Comparison Example | Monomer (parts) | | | | Oxygen permeability ($\times 10^{-11}$ cc·cm/cm²·sec·mmHg) | Vickers hardness number |
|---|---|---|---|---|---|---|
| | 19FM—OH | SiMA | MMA | EGDMA | | |
| 3 | 24 | 56 | 12 | 8 | 27.5 | 3.2 |
| 4 | 30 | 40 | 22 | 8 | 26.1 | 8.1 |
| 5 | 56 | 24 | 12 | 8 | 26.8 | 7.5 |

In this table, SiMA represents tris(trimethyl siloxy)silylpropyl methacrylate. Others are the same as the aforementioned.

TABLE 5

| Example and Comparison Example | Type of contact lens material | Permeability (T %) Before dipping | Permeability (T %) After dipping | Reduction rate of permeability (%) |
|---|---|---|---|---|
| Example 22 | Copolymer of Example 1 | 94.5 | 89.5 | 5.3 |
| Comparison Example | | | | |
| 6 | Polymethyl methacrylate | 98.2 | 88.9 | 9.5 |
| 7 | Siloxanylalkyl methacrylate copolymers | 94.0 | 83.2 | 11.5 |
| 8 | 2-Hydroxyethyl methacrylate copolymer | 95.0 | 60.0 | 36.8 |
| 9 | Copolymer of Comparison Example 4 | 95.2 | 86.5 | 9.1 |

TABLE 6

| Example or Comparison Example | Monomer (parts) | | | | | Contact angle (degree) |
|---|---|---|---|---|---|---|
| | 19FM-OH | MMA | HEMA | TPTMA | EGDMA | |
| Example | | | | | | |
| 23 | The same as Example 1 | | | | | 52 |
| 24 | The same as Example 4 | | | | | 47 |
| 25 | 70 | 13 | 10 | 7 | — | 35 |
| 26 | 70 | 18 | 5 | 7 | — | 38 |
| Comparison Example | | | | | | |
| 10 | — | 100 | — | — | — | 60 |
| 11 | 70(17FM) | 23 | — | 7 | — | 68 |
| 12 | The same as Comparison Example 4 | | | | | 62 |

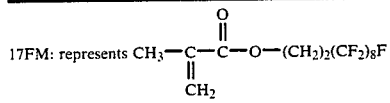

HEMA: 2-hydroxyethyl methacrylate

What is claimed is:

1. Contact lenses formed of copolymers comprising 50-95 parts by weight of a structural unit represented by formula (a):

$$\begin{matrix} & R^1 & \\ & | & \\ -&C-CH_2- & (1)\\ & | & \\ & O=COCH_2CH(OH)CH_2(O)_n-R_f & \end{matrix}$$

(where $R^1$ stands for a hydrogen atom or methyl group; Rf, a polyfluoroalkyl group having 1-15 carbon atoms and 2 to 31 fluorine atoms; and n, either 0 or 1), and 50-5 parts by weight of at least one member selected from structural units represented by formula (b):

$$\begin{matrix} & R^1 & \\ & | & \\ -&C-CH_2- & (2)\\ & | & \\ & O=COR^2 & \end{matrix}$$

(where $R^1$ stands for a hydrogen or methyl group and $R^2$ represents an alkyl group having 1-20 carbon atoms or a polyfluoroalkyl group having 1-15 carbon atoms);

$$\begin{matrix} & R^1 & \\ & | & \\ -&C-CH_2- & (3)\\ & | & \\ & O-C(=O)R^2 & \end{matrix}$$

(where $R^1$ and $R^2$ have the above defined meanings); or

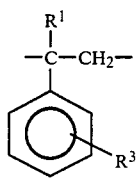

(where $R^1$ has the above defined meaning and $R^3$ represents a hydrogen atom, alkyl group having 1-5 carbon atoms or a halogen atom); or admixture thereof.

2. The contact lens of claim 1 wherein the Rf polyfluoroalkyl group of formula (a) has 5 to 10 carbon atoms and 10-20 fluorine atoms; and the structural unit of formula (b) comprises methyl, isopropyl, n-butyl, isobutyl, t-butyl, or cyclohexyl esters of methacrylic acid.

3. The contact lens of claim 1, further comprising up to 15 parts by weight, based on a total concentration of 100 parts, of a hydrophilic monomer unit.

4. The contact lens of claim 3, wherein the hydrophilic monomer comprises ethyleneglycol mono(meth)acrylate, diethyleneglycol mono(meth)acrylate, n-vinyl pyrrolidone, dimethyl acryl amide, methacrylic acid or acrylic acid.

5. The contact lens of claim 1, further comprising up to 20 parts by weight, based on 100 parts of the structural units of the formulas (a) and (b), of a crosslinking unit having at least two groups which permit crosslinking.

6. The contact lens of claim 5, wherein the crosslinking unit groups which permit crosslinking comprise ethylenically unsaturated groups.

7. The contact lens of claim 6, wherein the crosslinking unit comprises ethylene, glycol, dimethacrylate, diethylene glycol dimethacrylate, trimethylolpropane, trimethacrylate, allyl methacrylate, divinyl benzene, pentaerythrital tetramethacrylate, trimethylol propane trimethacrylate or ethylene glycol dimethacrylate.

* * * * *